(12) United States Patent
Galloway et al.

(10) Patent No.: US 7,735,509 B2
(45) Date of Patent: Jun. 15, 2010

(54) DISTRIBUTION VALVE MONITOR AND DISTRIBUTION VALVE INCORPORATING SAME

(76) Inventors: Iain A. F. Galloway, 24 Humphrey Drive, Stratford, Prince Edward Island C1B 1K2 (CA); Kelly A. Galloway, 24 Humphrey Drive, Stratford, Prince Edward Island C1B 1K2 (CA)

( * ) Notice: Subject to any disclaimer, the term of this patent is extended or adjusted under 35 U.S.C. 154(b) by 583 days.

(21) Appl. No.: 11/122,791

(22) Filed: May 4, 2005

(65) Prior Publication Data
US 2006/0032536 A1  Feb. 16, 2006

Related U.S. Application Data

(60) Provisional application No. 60/568,427, filed on May 4, 2004.

(51) Int. Cl.
*A01G 25/16* (2006.01)
*F16K 37/00* (2006.01)

(52) U.S. Cl. ............. 137/119.03; 137/554; 137/624.14; 137/625.11

(58) Field of Classification Search ................. 137/554, 137/625.11, 624.14, 624.18, 119.03, 119.04, 137/119.05
See application file for complete search history.

(56) References Cited

U.S. PATENT DOCUMENTS

| | | | | |
|---|---|---|---|---|
| 3,369,565 A | * | 2/1968 | Haggard, Jr. | 137/625.11 |
| 3,431,933 A | * | 3/1969 | Howard | 137/625.11 |
| 3,524,470 A | * | 8/1970 | Kah, Jr. et al. | 137/625.11 |
| 3,642,022 A | * | 2/1972 | Kirby | 137/625.11 |
| RE29,252 E | * | 6/1977 | Miller | 137/625.11 |
| 4,029,918 A | | 6/1977 | Kah, Jr. | |
| 4,125,124 A | | 11/1978 | Kah, Jr. | |
| 4,126,271 A | | 11/1978 | Kah, Jr. | |
| 4,146,054 A | | 3/1979 | Kah, Jr. | |
| 4,272,024 A | | 6/1981 | Kah, Jr. | |
| 4,305,310 A | | 12/1981 | Kah, Jr. | |
| 4,310,023 A | | 1/1982 | Kah, Jr. | |
| 4,316,480 A | | 2/1982 | Kah, Jr. | |
| 4,349,045 A | | 9/1982 | Kah, Jr. | |
| 4,350,429 A | * | 9/1982 | Slavin | 137/625.11 |
| 4,353,507 A | | 10/1982 | Kah, Jr. | |
| 4,366,944 A | | 1/1983 | Kah, Jr. | |
| 4,458,708 A | * | 7/1984 | Leonard et al. | 137/625.11 |
| 4,469,304 A | | 9/1984 | Kah, Jr. | |
| 4,492,247 A | * | 1/1985 | Lockwood | 137/119.03 |
| 4,501,297 A | * | 2/1985 | Baker | 137/625.11 |
| 4,508,136 A | | 4/1985 | Kah, Jr. | |
| 4,807,662 A | * | 2/1989 | Verne | 137/554 |
| 4,867,378 A | | 9/1989 | Kah, Jr. | |
| 4,878,006 A | | 10/1989 | Kah, Jr. | |
| 4,901,924 A | | 2/1990 | Kah, Jr. | |
| 4,955,542 A | | 9/1990 | Kah, Jr. | |

(Continued)

*Primary Examiner*—John Rivell
(74) *Attorney, Agent, or Firm*—Beyer Law Group LLP (57) ABSTRACT

A distribution valve monitor to monitor the operation of a distribution valve of the type having an inlet and a plurality of outlets, which couples the outlets to the inlet according to a desired fluid distribution pattern comprises a plurality of non-contact sensors disposed at spaced locations about the distribution valve to sense activation of the valve to different operating conditions. A controller communicates with the sensors and records data representing the operation of the valve. The recorded data is examined to detect improper operation of the distribution valve.

58 Claims, 4 Drawing Sheets

U.S. PATENT DOCUMENTS

| | | | |
|---|---|---|---|
| 4,987,917 A | 1/1991 | Kah, Jr. | |
| 5,046,522 A * | 9/1991 | Le Devehat et al. | 137/554 |
| 5,082,015 A * | 1/1992 | Baker | 137/119.03 |
| 5,086,977 A | 2/1992 | Kah, Jr. | |
| 5,098,021 A | 3/1992 | Kah, Jr. | |
| 5,104,045 A | 4/1992 | Kah, Jr. | |
| 5,148,990 A | 9/1992 | Kah, Jr. | |
| 5,148,991 A | 9/1992 | Kah, Jr. | |
| 5,199,646 A | 4/1993 | Kah, Jr. | |
| 5,213,016 A | 5/1993 | Kah, Jr. | |
| 5,245,314 A | 9/1993 | Kah, Jr. | |
| 5,329,465 A * | 7/1994 | Arcella et al. | 137/554 |
| 5,357,254 A | 10/1994 | Kah, Jr. | |
| 5,417,370 A | 5/1995 | Kah, Jr. | |
| RE35,037 E | 9/1995 | Kah, Jr. | |
| 5,490,286 A | 2/1996 | Kah, Jr. | |
| 5,588,594 A | 12/1996 | Kah, Jr. | |
| 5,645,264 A | 7/1997 | Kah, Jr. | |
| 5,653,390 A | 8/1997 | Kah, Jr. | |
| 5,709,370 A | 1/1998 | Kah, Jr. | |
| 5,762,092 A * | 6/1998 | Yang | 137/625.11 |
| 5,826,797 A | 10/1998 | Kah, III | |
| 6,085,995 A | 7/2000 | Kah, Jr. | |
| 6,098,646 A * | 8/2000 | Hennemann et al. | 137/554 |
| 6,109,545 A | 8/2000 | Kah, Jr. | |
| 6,182,909 B1 | 2/2001 | Kah, Jr. et al. | |
| 6,237,862 B1 | 5/2001 | Kah, III et al. | |
| 6,336,597 B1 | 1/2002 | Kah, Jr. | |
| 6,601,781 B2 | 8/2003 | Kah, III et al. | |
| 6,732,952 B2 | 5/2004 | Kah, Jr. | |
| 6,755,204 B2 * | 6/2004 | Herbert et al. | 137/119.03 |
| 6,834,816 B2 | 12/2004 | Kah, Jr. | |
| 6,932,112 B2 * | 8/2005 | Bradford et al. | 137/625.11 |
| 7,000,889 B2 | 2/2006 | Kah et al. | |
| 7,044,403 B2 | 5/2006 | Kah, III et al. | |
| 7,134,613 B2 | 11/2006 | Kah, III | |
| 7,143,962 B2 | 12/2006 | Kah, Jr. | |
| 7,226,003 B2 | 6/2007 | Kah et al. | |
| 7,232,078 B2 | 6/2007 | Kah, Jr. | |
| 7,232,081 B2 | 6/2007 | Kah et al. | |
| 7,232,106 B2 | 6/2007 | Kah et al. | |
| 7,232,107 B2 | 6/2007 | Kah et al. | |
| 7,287,712 B2 | 10/2007 | Kah, Jr. | |
| 2002/0023972 A1 | 2/2002 | Kah et al. | |
| 2002/0130202 A1 | 9/2002 | Kah et al. | |
| 2002/0162902 A1 | 11/2002 | Kah, Jr. | |
| 2003/0231783 A1 | 12/2003 | Kah, Jr. | |
| 2006/0261182 A1 | 11/2006 | Kah et al. | |
| 2006/0262524 A1 | 11/2006 | Kah, Jr. | |
| 2006/0273193 A1 | 12/2006 | Kah, Jr. | |
| 2006/0278727 A1 | 12/2006 | Kah, Jr. | |
| 2007/0027558 A1 | 2/2007 | Kah, Jr. | |
| 2007/0034711 A1 | 2/2007 | Kah, Jr. | |
| 2007/0034712 A1 | 2/2007 | Kah, Jr. | |
| 2007/0119976 A1 | 5/2007 | Kah et al. | |
| 2007/0131802 A1 | 6/2007 | Kah et al. | |
| 2007/0208462 A1 | 9/2007 | Kah, Jr. | |
| 2007/0235565 A1 | 10/2007 | Kah et al. | |

* cited by examiner

DISTRIBUTION VALVE MONITOR AND DISTRIBUTION VALVE INCORPORATING SAME

CROSS-REFERENCE TO RELATED APPLICATION

The present application claims the benefit of U.S. Provisional Patent Application No. 60/568,427 filed on May 4, 2004 entitled "Distribution Valve Monitor and Distribution Valve Incorporating Same" which is hereby incorporated herein by reference.

FIELD OF THE INVENTION

The present invention relates generally to, valve diagnostics and in particular to a distribution valve monitor and to a distribution valve incorporating the same.

BACKGROUND OF THE INVENTION

Distribution valves are known in the art and have been used in both irrigation and wastewater treatment systems to allow fluid to be effectively distributed over large areas. One common mechanical liquid distribution valve (MLDV) is manufactured by K-Rain Corporation of Florida. This MLDV includes an enclosure having a single inlet and a plurality of outlets, typically four (4), five (5) or six (6). A plunger is centrally disposed within the enclosure and is secured to a rubber plate that can be moved to seat against the valve bottom. The plate has an aperture therein that aligns with one of the outlets. The plunger accommodates a spring element that acts on the plate to force it away from valve bottom. When fluid under pressure is supplied to the inlet, the force of the fluid moves the plunger down through a cam causing the plunger and plate to rotate and seat the plate against the valve bottom with the aperture in the plate in alignment with one of the outlets. When the fluid pressure supplied to the inlet drops, the plate and plunger are biased back upwardly thereby moving the plunger back through the cam and causing the plunger and plate to rotate. When fluid under pressure is again supplied to the inlet, the plunger and plate move downwardly against the spring bias and rotate thereby to seat the plate against the valve bottom with the aperture in the plate in alignment with the next outlet. Cycling fluid pressure to the MLDV in this manner therefore allows the incoming fluid to be distributed to the outlets of the MLDV in succession.

Figure 1:
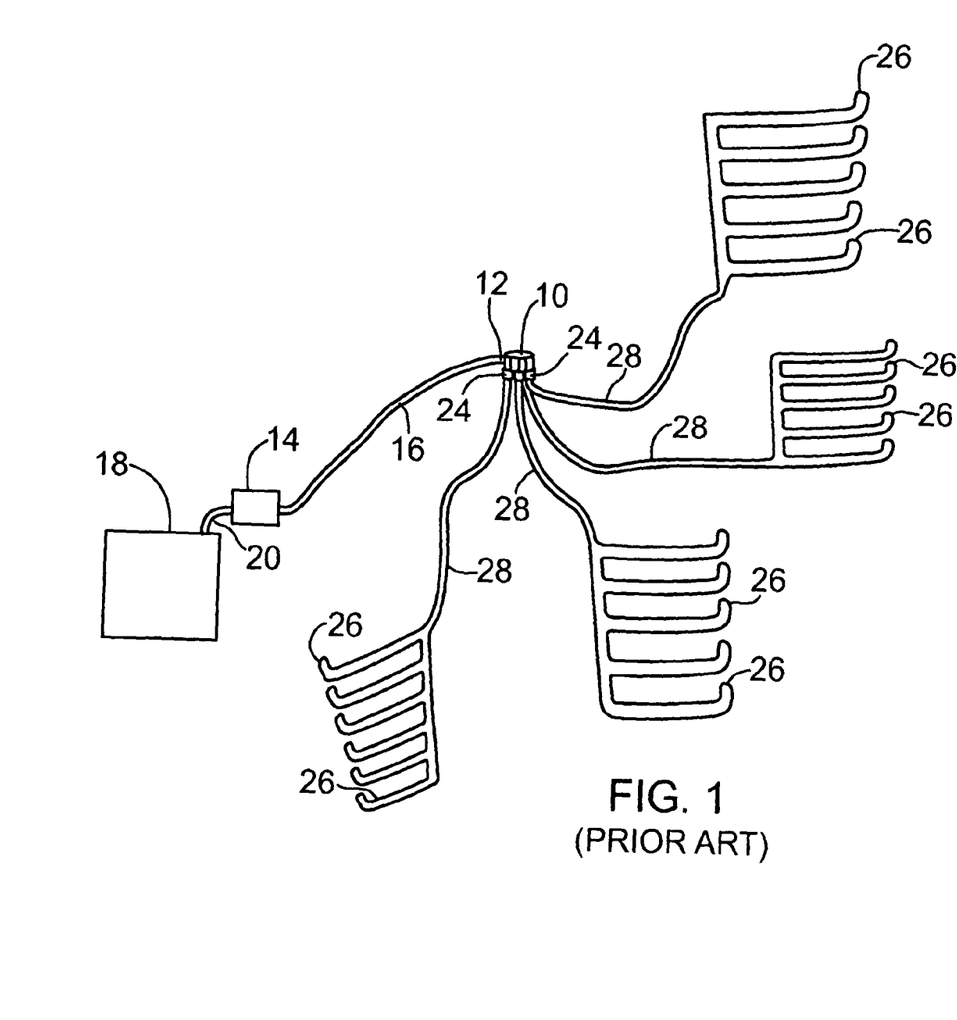
FIG. 1 is a schematic view of a conventional fluid distribution system incorporating a mechanical liquid distribution valve (MLDV)

FIG. 1 shows a conventional arrangement for an MLDV 10. As can be seen, the MLDV 10 includes an inlet 12 connected to a pump 14 via a conduit 16. The pump 14 draws fluid from a fluid source such as a reservoir or tank 18 via a conduit 20. The pump 14 is operated to cyclically supply fluid under pressure to the inlet 12 of the MLDV 10 at intervals. The outlets 24 of the MLDV 10 are connected to a plurality of discharge points 26 positioned at different zones by conduits 28. During typical operation, the MLDV 10 couples the outlets 24 to the inlet 12 in succession so that fluid flow to the discharge points 26 cycles through a desired pattern allowing the fluid to be effectively distributed.

Although MLDVs serve a valuable and useful purpose, they are subject to failure and/or improper operation. Over time, MLDVs can be worn resulting in failure. Rocks or other debris may become lodged in the MLDV internal mechanisms thereby preventing the MLDVs from moving through their cycles. Installation errors may also result in improper MLDV operation. Furthermore, sub-optimal pump timing, freezing, insufficient fluid flow or inadequate fluid pressure and/or air in the conduits may result in inconsistent MLDV operation and skipping.

Regardless of the environment in which MLDVs are being used, it is important for the MLDVs to operate properly so that fluid is applied uniformly throughout the various zones. Failure to do so can be problematic. In irrigation systems, failure of MLDVs may result in zones being supplied with excess or insufficient water. In farming environments, excess water in any particular zone may reduce crop yields due to leaching of plant nutrients, increase disease incidence and/or fail to stimulate growth of commercially valuable parts of crops. Insufficient watering in any particular zone may lead to high soil moisture tension that creates plant stress and reduces crop yield. In other environments such as for example on golf courses where MLDVs are used to distribute water to greens, failure or skipping of the MLDVs may result in extensive damage.

When used in wastewater treatment and/or disposal systems, failure of MLDVs is of even more concern due to the potential environmental impact resulting from such a failure. Even distribution of treated effluent across dispersal zones is essential to ensure that the treated effluent is naturally absorbed into the environment. In wastewater treatment systems employing filter media such as for example, soils, textile filters etc., if the filter media is overloaded, its ability to treat effluent may be adversely affected potentially resulting in serious environmental problems including groundwater contamination and surfacing/breakout of untreated effluent.

Unfortunately, to-date there has been no convenient way of determining whether MLDVs are operating properly. Presently, in order to determine proper MLDV operation, it is necessary to visually inspect each MLDV. During inspection, the system must be partially dismantled so that the MLDV can be cycled by manually turning the inlet fluid pressure on and off and visually monitoring the fluid output of the MLDV. As will be appreciated, inspecting MLDVs in this manner is time consuming and impractical especially in systems employing significant numbers of MLDVs. As a result, there is a need for improved methods of monitoring MLDV operation.

It is therefore an object of the present invention to provide a novel distribution valve monitor and a novel distribution valve incorporating the same.

SUMMARY OF THE INVENTION

According to one aspect, there is provided a distribution valve monitor to monitor the operation of a distribution valve of the type having an inlet and a plurality of outlets, which couples the outlets to the inlet according to a desired fluid distribution pattern. The monitor includes a plurality of non-contact sensors disposed at spaced location about the distribution valve to sense activation of the valve to different operating conditions. A controller communicates with the sensors and records data representing the operation of the distribution valve. The recorded data is examined to detect improper operation and/or failure of the valve.

In one embodiment, an alarm signal is generated when the controller determines that the operation of the valve has been significantly compromised i.e. the valve has jammed or skips. The sensors are hall effect sensors and detect the presence of magnets disposed within the valve as the magnets move during cycling of the valve. The sensors include a plunger sensor to sense reciprocation of a plunger within the distribution valve and rotation sensors to sense rotation of a plate within the distribution valve. A magnet is disposed on the plunger and on the plate. The distribution valve monitor can be retrofitted to an existing distribution valve or incorporated into the distribution valve thereby to form an integrated unit.

In one embodiment, the sensors and controller are accommodated within an enclosure. The enclosure is shaped to receive the distribution valve. The distribution valve monitor may include a user interface having a display to enable recorded data and/or distribution valve operation data to be visually presented. The controller compares recorded data with desired distribution valve operating data to detect improper distribution valve operation. The desired distribution valve operating data may be programmable. The distribution valve monitor may further comprise an interface to enable recorded distribution valve operation data to be downloaded to a remote location.

According to another aspect there is provided a distribution valve monitor to monitor the operation of a distribution valve of the type having at least one inlet, a plurality of outlets and a valve mechanism coupling the outlets to the inlet in succession in response to changes in inlet fluid pressure. A distribution valve monitor includes a plurality of sensors disposed at spaced locations about the distribution valve sensing different valve operating conditions. A controller communicates with the sensors and processes sensor output to detect operation of the distribution valve deviating from desired distribution valve operation.

According to yet another aspect there is provided a distribution valve comprising an inlet receiving fluid from a fluid source, a plurality of outlets to deliver fluid to be distributed, a valve mechanism actuable to connect the outlet to the inlet in a desired sequence and a monitor monitoring operation of the valve mechanism and generating an alarm signal when the valve mechanism malfunctions.

In one embodiment, the monitor generates the alarm signal upon jamming or skipping of the valve mechanism. The valve mechanism includes a plurality of spaced magnets thereon. The monitor detects the presence/absence of the magnets to determine the operation of the valve mechanism.

The distribution valve monitor provides advantages in that operation of the distribution valve is recorded and stored. An alarm signal may be generated when the distribution valve fails or malfunctions allowing distribution valve failure to be determined without having to manually cycle the inlet fluid pressure to the distribution valve and visually monitor the distribution valve output. The distribution valve monitor is also easily installed on existing distribution valves without requiring significant modification of the distribution valve.

BRIEF DESCRIPTION OF THE DRAWINGS

An embodiment will now be described more fully with reference to the accompanying drawings in which.

DETAILED DESCRIPTION OF THE PREFERRED EMBODIMENTS

Figure 2:
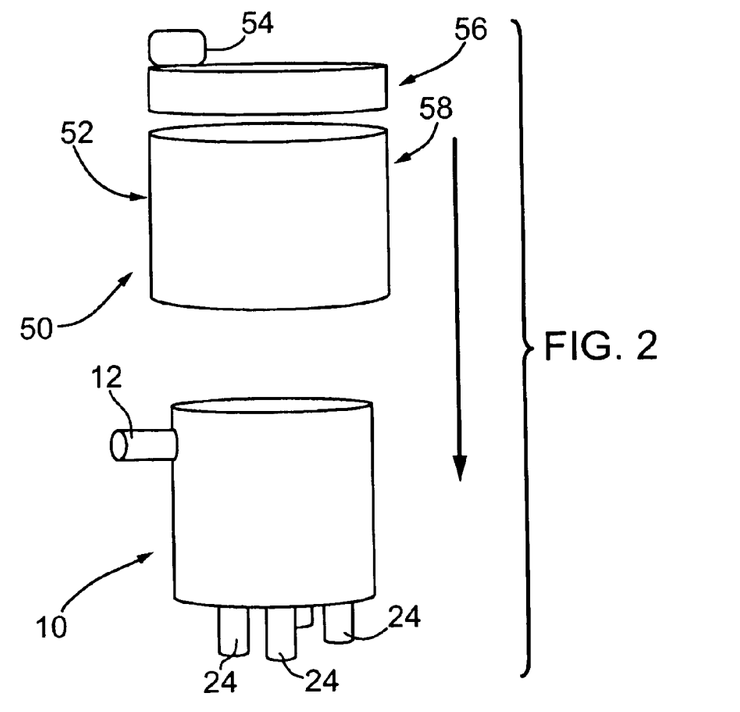
FIG. 2 is a side view of the MLDV and a distribution valve monitor in an unassembled condition.
Figure 3:
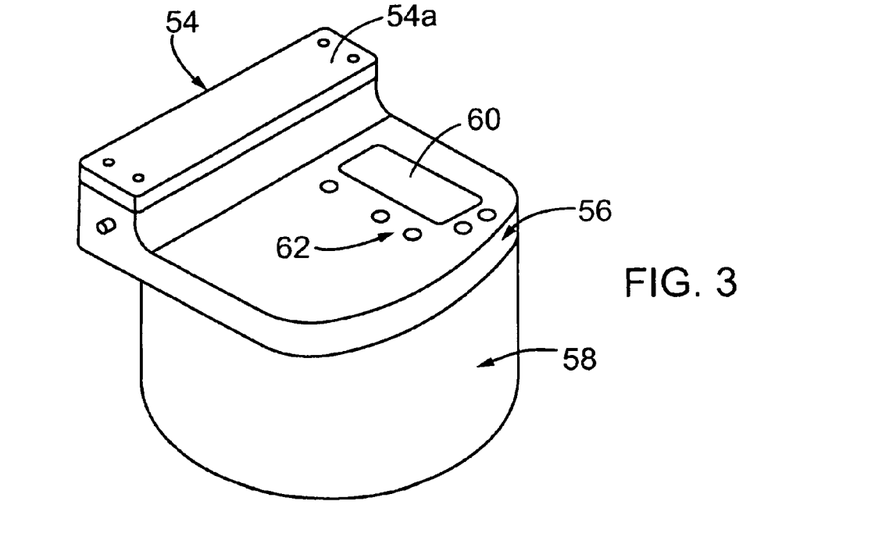
FIG. 3 is a perspective view of the distribution valve monitor.

Turning now to FIGS. 2 and 3, the mechanical liquid distribution valve (MLDV) 10 and a distribution valve monitor 50 are shown in an unassembled condition. Distribution valve monitor 50 monitors the operation of the MLDV 10 so that failure or improper operation of the MLDV 10 can be recorded and used to signal an alarm condition depending on the severity of the MLDV operating state.

The distribution valve monitor 50 comprises a sealed enclosure 52 including three compartments, namely a battery and access compartment 54, an electronics and plunger sensor compartment 56 and a rotation sensor compartment 58. The rotation sensor compartment 58 is generally tubular and is sized to accommodate the MLDV 10 so that the rotation sensor compartment 58, for the most part, surrounds the MLDV 10 with the electronics and plunger compartment 56 sitting on top of the MLDV 10. A liquid crystal display (LCD) 60 and a user actuable keypad 62 are provided on the top surface of the electronics and plunger sensor compartment 56 making the LCD 60 and keypad 62 readily available to a user.

Figure 4:
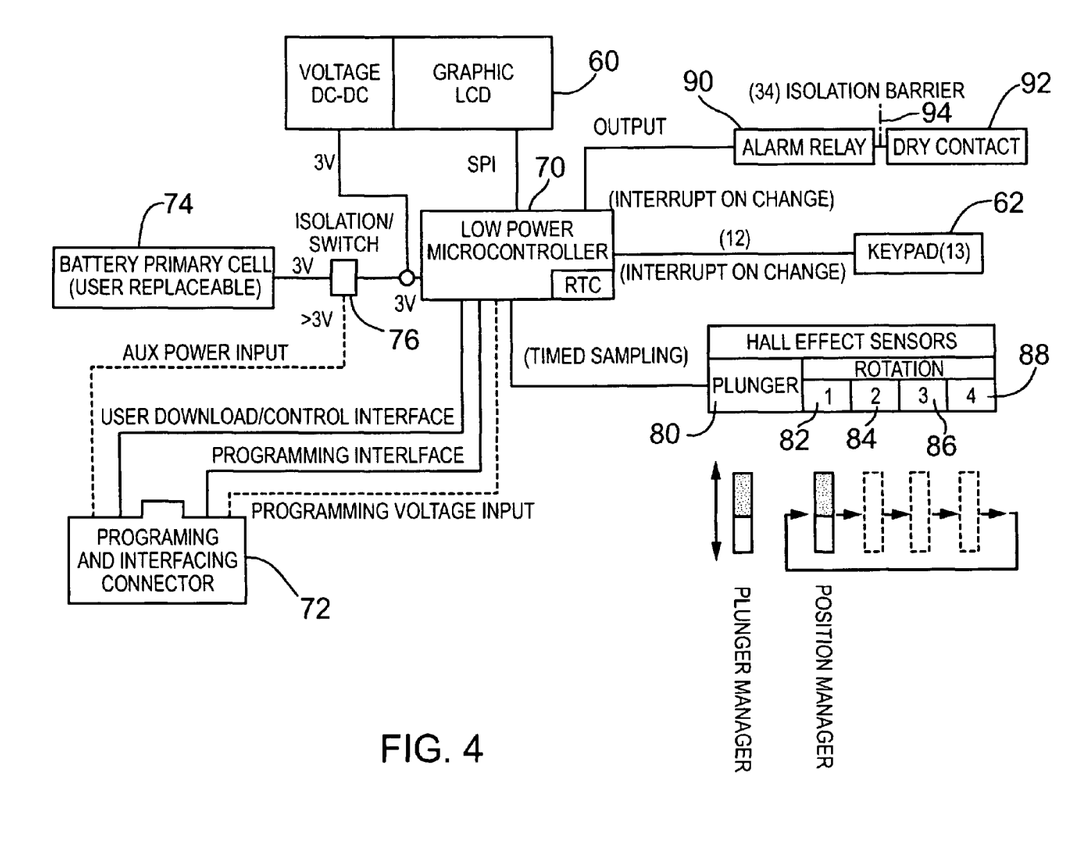
FIG. 4 is a schematic block diagram of the distribution valve monitor.

FIG. 4 is a schematic diagram of the internal components of the distribution valve monitor 50. As can be seen, the distribution valve monitor includes a low power microcontroller 70 coupled to the LCD 60, the keypad 62 and a programming and interfacing connector 72. Programming and interfacing connector 72 is physically located within the battery and access compartment 54 and is accessible through removal of the lid 54a of the battery and access compartment 54. A replaceable battery 74 is also accommodated by the battery and access compartment 54 and provides operating power to the internal components. Alternatively, the operating power may be provided via the programming and interfacing connector 72 through an isolation switch 76. Microcontroller 70 samples the output of a plurality of hall effect sensors, namely a plunger sensor 80 and rotation sensors 82 to 88. The sampled sensor output is processed by the microcontroller 70 and used to provide output to an alarm relay 90 if an alarm condition exists. Alarm relay 90 is coupled to a dry contact 92 disposed within battery and access compartment 54 via an isolation barrier 94. Dry contact 92 is electrically connected to an alarm panel (not shown) through a copper or fibre-optic link.

Figure 5:
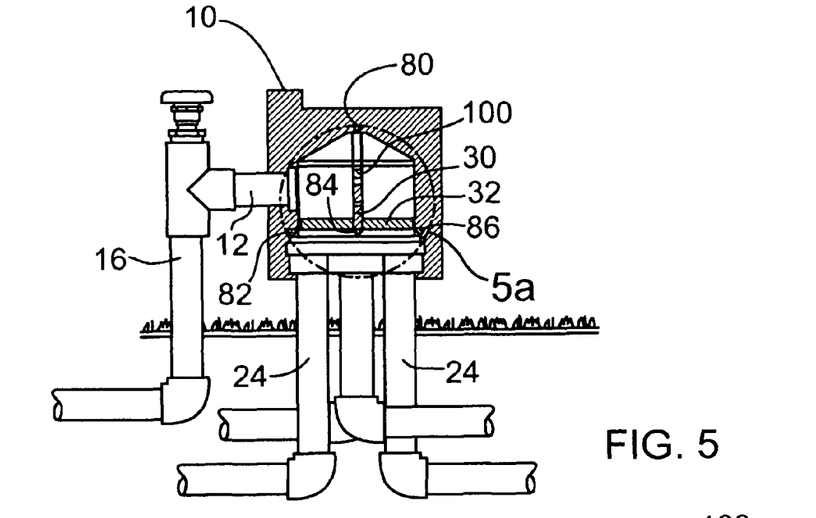
FIG. 5 is a side sectional view of the MLDV and distribution valve monitor in an assembled condition.
Figures 5A, 6:
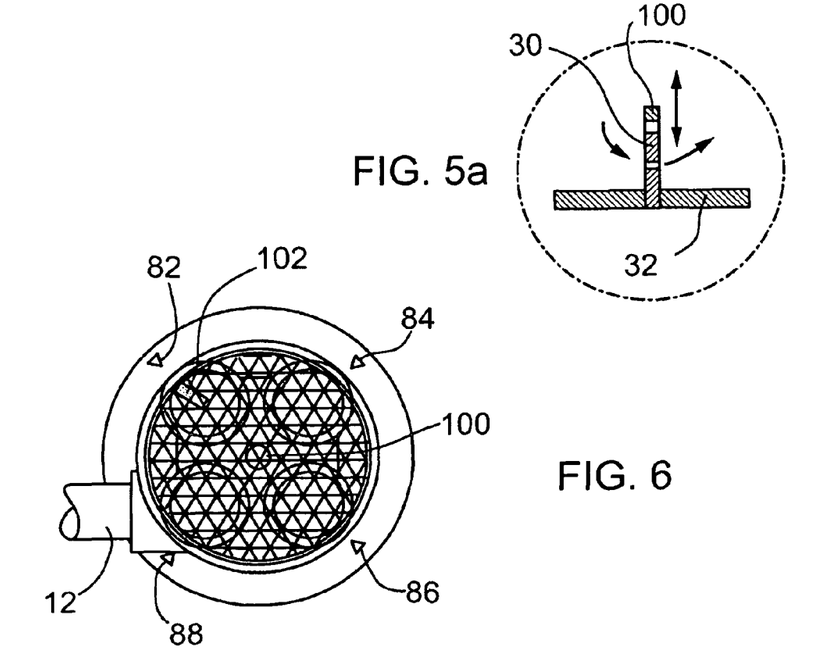
FIG. 6 is a cross-sectional view of FIG. 5.

The microcontroller 70 and plunger sensor 80 are physically located within the electronics and plunger sensor compartment 56 with the plunger sensor 80 being disposed directly over the plunger 30 of the MLDV 10 (see FIGS. 6 and 7). The rotation sensors 82 to 88 are physically located within the rotation sensor compartment 58 and are disposed about the compartment at generally equal circumferencially spaced locations. The rotation sensors 82 to 88 lie in a plane that corresponds generally to the plane of the plate 32 of the MLDV 10.

FIGS. 6 and 7 best illustrate the positions of the plunger sensor 80 and the rotation sensors 82 to 88 relative to the plunger 30 and plate 32 of the MLDV 10. In order to allow the plunger sensor 80 and rotation sensors 82 to 88 to detect the operational status of the MLDV 10, a magnet 100 is provided at the top of the plunger 30 and a magnet 102 is provided on the plate 32 in line with the aperture in the plate 32. As will be appreciated, when the plunger 30 moves upwardly within the MLDV 10 and brings the magnet 100 in close proximity to the plunger sensor 80, the plunger sensor 80 generates a logic high output. When the plunger 30 is biased downwardly, the output of the plunger sensor 80 returns to a logic low level. When the plate 32 rotates to bring the magnet 102 in close proximity to one of the rotation sensors 82 to 88, that rotation sensor generates a logic high output with the output of the remaining rotation sensors remaining at a logic low level. The microcontroller 70 samples the plunger and rotation sensor outputs thereby to collect actual MLDV operational data.

The microcontroller 70 includes non-volatile memory (not shown) so that data stored therein remains intact even in low and no power conditions. The non-volatile memory is programmed with desired MLDV operating data. The desired MLDV operating data is compared with actual MLDV operating data so that MLDV failure and/or malfunction can be detected. In particular, the operating data is examined to detect MLDV positioning, sequencing and/or timing errors. Data representing the elapsed time the MLDV 10 spends at each outlet position and all detected operational errors and malfunctions are also stored in the non-volatile memory thereby to keep historical data concerning the operation of the MLDV 10.

The operation of the distribution valve monitor 50 will now be described. As mentioned previously, in normal operation of the MLDV 10, fluid pressure supplied to the inlet 12 of the MLDV 10 is cycled according to a desired fluid distribution sequence. Each time the fluid pressure supplied to the inlet 12 drops and then increases, the plunger 30 and plate 32 reciprocate from a down position to an upwardly extended position before returning to the down position. During movement of the plunger 30 and plate 32 up and then back down, the plunger 30 and plate 32 rotate thereby to bring the aperture therein into alignment with a different outlet 24 of the MLDV 10.

Each time the plunger 30 nears the top of its stroke, the magnetic field generated by the magnet 100 causes the plunger sensor 80 to output a logic high. The logic high condition is sampled by the microcontroller 70 and stored allowing the microcontroller 70 to record the duration the plunger 30 remains at the top of its stroke as well as the elapsed time between each plunger reciprocation.

As the plate 32 rotates to bring the aperture therein into alignment with a different outlet 24, the magnet 102 is brought into proximity with the rotation sensor associated with that outlet. The magnetic field generated by the magnet 102 causes the rotation sensor to output a logic high. The logic high condition is sampled by the microcontroller 70 and stored allowing the microcontroller 70 to record the duration the plate 32 remains in that position and hence the duration the inlet 12 is coupled to that particular output.

The average time the MLDV 10 spends at each outlet is calculated. If deviations in average time exist that are above a threshold level signifying failure and/or improper operation of the MLDV 10, an alarm signal is generated. By measuring the elapsed time between strokes of the plunger 30 and the duration the plate 32 remains at each outlet position, the MLDV 10 can be monitored to ensure it cycles properly and is not jammed or skipping. Also by measuring the duration the plate 32 spends at each outlet position, the MLDV can be monitored to ensure fluid is being distributed evenly to each outlet 24. Measuring the duration the plunger 30 remains at the top of its stroke allows sticking plunger conditions to be detected.

When MLDV jamming or skipping conditions are detected by the microcontroller 70, the microcontroller generates an alarm signal causing the alarm relay 90 to close thereby to provide the alarm signal to the alarm panel via the dry contact 92. Plunger sticking conditions and deviations in the duration of the plate 32 at each outlet position are recorded until the situations become severe at which time the microcontroller 70 generates an alarm signal.

When the microcontroller 70 is not receiving input from the plunger sensor 80 and rotation sensors 82 to 88, the microcontroller 70 is conditioned to a "sleep" mode to conserve power. The microcontroller however switches to a "wake" mode either in response to activation of one or more keys on the keypad 62 or a change in input received from one of the plunger and rotation sensors.

The LCD 60 and keypad 62 provide a user interface that allows a user to determine and view the operational status of the MLDV as well as recorded data. In particular, through use of the keypad 62, the LCD 60 can be conditioned to display the current operational status of the MLDV i.e. OK or Error, the status of the plunger sensor 80 and rotation sensors 82 to 88, the position of the plate 32, a menu of logged MLDV failures/malfunctions and suggested causes as well as associated times and dates.

The programming and interfacing connector 72 allows a reading device to be coupled to the microcontroller 70 through an interface connector so that stored data can be read and downloaded. The interface connector also allows a device to be coupled to the microcontroller 70 so that the desired MLDV operating data can be updated.

The four (4) outlet MLDV is shown for illustrative purposes only. As will be appreciated, the distribution valve monitor can of course be used with MLDVs including fewer or more outlets. Although hall effect sensors in conjunction with magnets are used to sense movement of the plunger and plate, other non-contact sensing arrangements can of course be used.

The distribution valve monitor as illustrated is installed over an existing MLDV with the MLDV being modified to include the magnets 100 and 102. If desired, the distribution valve monitor and MLDV can be integrated into a single unit to yield a distribution valve that monitors and records its operating status and generates an alarm signal in the event of failure and/or malfunction.

If desired, rather than using a physical connection between the dry contact 92 and the alarm panel and a physical connector 72 in the battery and access compartment 54, the distribution valve monitor may include one or more wireless transceivers to transmit alarm signals to the alarm panel and/or to transmit recorded MLDV operating and error/malfunction data to a remote station and to receive desired MLDV operating data updates from the remote station.

Although preferred embodiments have been described, those of skill in the art will appreciate that variations and modifications may be made without departing from the spirit and scope thereof as defined by the appended claims.

What is claimed is:

1. A distribution valve comprising:

a housing having an internal fluid chamber;

at least one inlet to permit the ingress of fluid into said fluid chamber;

a plurality of outlets to permit the egress of fluid from said fluid chamber;

a valve member disposed within said fluid chamber, said valve member carrying at least one rotary position identifying element thereon, said valve member rotating and reciprocating to connect each of said outlets to said fluid chamber in succession in response to alternating drops and rises in pressure of the fluid supplied to said at least one inlet;

a plurality of non-contact sensors disposed at spaced locations external of and about said fluid chamber to sense the presence of said at least one rotary position identifying element at different positions within said fluid chamber as said valve member moves; and a controller communicating with the sensors and recording data representing the operation of the distribution valve, said recorded data being examined to detect improper operation of said distribution valve.

2. A distribution valve according to claim 1 wherein said controller generates an alarm signal when the operation of said distribution valve is determined to have been compromised.

3. A distribution valve according to claim 2 wherein said controller generates said alarm signal when said distribution valve jams or skips.

4. A distribution valve according to claim 1 wherein said sensors are hall effect sensors that detect the presence of magnets disposed on said valve member as the magnets move during cycling of the valve member.

5. A distribution valve according to claim 4 wherein said valve member includes a disc having a passage therein alignable with each outlet in succession and a plunger mounted on said disc, and wherein said sensors include a plunger sensor to sense reciprocation of said plunger and rotation sensors to sense rotation of said disc, and wherein said at least one position identifying element includes one magnet disposed on said plunger and another magnet disposed on said disc.

6. A distribution valve according to claim 1 wherein at least one of said sensors and controller are accommodated within an enclosure separate from said housing.

7. A distribution valve according to claim 6 wherein said enclosure is shaped to receive said housing.

8. A distribution valve according to claim 7 wherein said sensors are hall effect sensors that detect the presence of magnets disposed on said valve member as the magnets move during movement of the valve.

9. A distribution valve according to claim 7 wherein said valve member includes a disc having a passage therein alignable with each outlet in succession and a plunger mounted on said disc, and wherein said sensors include a plunger sensor to sense reciprocation of said plunger and rotation sensors to sense rotation of said disc, and wherein said at least one position identifying element includes one magnet disposed on said plunger and another magnet disposed on said disc.

10. A distribution valve according to claim 3 further comprising:
a user interface including a display to enable recorded data and/or distribution valve operation data to be visually presented.

11. A distribution valve according to claim 10 wherein said controller compares recorded data with desired distribution valve operating data to detect improper distribution valve operation.

12. A distribution valve according to claim 11 wherein said desired distribution valve operating data is programmable.

13. A distribution valve according to claim 1 further comprising:
an interface to enable recorded distribution valve operation data to be downloaded to a remote location.

14. A distribution valve according to claim 13 further comprising:
a user interface including a display to enable recorded data and/or distribution valve operation data to be visually presented.

15. A distribution valve according to claim 14 wherein said controller compares recorded data with desired distribution valve operating data to detect improper distribution valve operation.

16. A distribution valve according to claim 15 wherein said desired distribution valve operating data is programmable.

17. A distribution valve comprising:
a housing comprising at least peripheral one sidewall surrounding an internal fluid chamber;
at least one inlet to permit the ingress of fluid into said fluid chamber;
a plurality of outlets communicating with said fluid chamber to permit the egress of fluid from said fluid chamber;
a valve mechanism coupling the outlets to the inlet in succession in response to cycling of inlet fluid pressure, said valve mechanism including a rotatable disc member disposed within said fluid chamber, said disc member having an opening therein alignable with each outlet in succession as said disc member rotates in response to a drop and subsequent rise in inlet fluid pressure, said disc member carrying at least one rotary position identifying element;
a plurality of sensors disposed at spaced locations external of and circumferentially about said fluid chamber, each sensor sensing the at least one rotary position identifying element on said disc member as the disc member rotates to bring the at least one rotary position identifying element into proximity to said sensor; and
a controller communicating with the sensors and processing sensor output generated in response to sensing of the at least one rotary position identifying element to detect operation of said distribution valve deviating from desired distribution valve operation.

18. A distribution valve according to claim 17 further comprising:
memory storing desired distribution valve operation data, said controller comparing sensor output with the desired distribution valve operation data to detect deviant distribution valve operation.

19. A distribution valve according to claim 18 wherein said desired distribution valve operation data is programmable.

20. A distribution valve according to claim 18 wherein said controller generates an alarm signal when the operation of said distribution valve is determined to have been compromised.

21. A distribution valve according to claim 20 wherein said controller generates said alarm signal when said distribution valve jams or skips.

22. A distribution valve according to claim 18 wherein said sensors and controller are accommodated within an enclosure separate from said housing.

23. A distribution valve according to claim 22 wherein said enclosure is shaped to receive said housing.

24. A distribution valve according to claim 18 further comprising:
a user interface including a display to enable recorded data and/or distribution valve operation data to be visually presented.

25. A distribution valve comprising:
a housing;
a fluid chamber within said housing;
an inlet receiving fluid from a fluid source and delivering the fluid to said fluid chamber;
a plurality of outlets communicating with said fluid chamber to permit the egress of fluid from said fluid chamber and deliver fluid to be distributed;
a valve mechanism disposed in said fluid chamber, said valve member being actuable in response to cycling pressure of the fluid supplied to said inlet to connect said outlets to said inlet in a desired sequence, said valve mechanism including a plate having an opening therein, said plate being mounted on a reciprocating shaft, said plate carrying at least one rotary position indicator and said shaft carrying at least one axial position indicator, said plate rotating to a different position upon reciprocation of said shaft in response to a drop and subsequent rise in pressure of the fluid supplied to said inlet, at each position said opening being in alignment with a different one of said outlets; and a monitor comprising a plurality of non-contact sensors external of and positioned at spaced locations about said fluid chamber, said sensors sensing the at least one rotary indicator thereby to determine the rotary position of said plate as said plate rotates within said fluid chamber and sensing the at least one axial indicator thereby to detect reciprocation of said shaft, said monitor tracking the rotary position of said plate at each outlet and generating an alarm signal when said valve mechanism malfunctions.

26. A distribution valve according to claim 25 wherein said monitor generates said alarm signal upon jamming or skipping of said valve mechanism.

27. A distribution valve according to claim 25 wherein said monitor includes memory storing desired distribution valve operation data and a controller comparing the sensor output with the desired distribution valve operation data to detect deviant valve mechanism operation.

28. A distribution valve according to claim 27 further comprising:
a user interface including a display to enable recorded data and/or distribution valve operation data to be visually presented.

29. A distribution valve according to claim 28 wherein said desired distribution valve operation data is programmable.

30. A distribution valve according to claim 28 further comprising:
an interface to enable recorded distribution valve operation data to be downloaded to a remote location.

31. An irrigation/wastewater distribution system comprising:
a distribution valve including a housing having an internal fluid chamber, an inlet coupled to an input fluid source to permit the ingress of fluid into said fluid chamber, a plurality of outlets to permit the egress of fluid from said fluid chamber, and a valve element within said fluid chamber, said valve element carrying at least one rotary position identifying element and unseating, rotating and re-seating through a sequence of positions in response to alternating drops and rises in pressure of the input fluid supplied to said inlet, at each position said valve element connecting a different outlet to said fluid chamber;
a plurality of distribution conduits, each of said distribution conduits being connected to a respective one of said outlets, each distribution conduit extending from said distribution valve into an outside environmentally exposed distribution field and discharging fluid onto said distribution field when the outlet to which the distribution conduit is connected, is connected to said fluid chamber by said valve element;
a monitor comprising a plurality of non-contact sensors external of said fluid chamber to detect the at least one rotary position identifying element, said monitor sensing the valve element at each said position; and
a controller communicating with the sensors and recording data representing the operation of the distribution valve.

32. An irrigation/wastewater distribution system according to claim 31 wherein said monitor is retro-fit onto said distribution valve.

33. An irrigation/wastewater distribution system according to claim 31 wherein said controller compares the recorded data with desired distribution valve operation data to detect deviant distribution valve operation.

34. An irrigation/wastewater distribution system according to claim 32 wherein said sensors sense rotation of said valve element and reciprocation of said valve element.

35. An irrigation/wastewater distribution system according to claim 33 wherein said desired distribution valve operation data is programmable.

36. An irrigation/wastewater distribution system according to claim 33 further comprising a user interface including a display to enable recorded data and/or distribution valve operation data to be visually presented.

37. An irrigation/wastewater distribution system according to claim 33 further comprising an interface to enable recorded distribution valve operation data to be downloaded to a remote location.

38. An irrigation/wastewater distribution system comprising:
a distribution valve including a housing having an internal fluid chamber, an inlet communicating with said fluid chamber for coupling to an input fluid source to permit the ingress of fluid into said fluid chamber, a plurality of outlets communicating with said fluid chamber to permit the egress of fluid from said fluid chamber, and a valve element within said fluid chamber, said valve element unseating, rotating and re-seating through a sequence of positions in response to alternating drops and rises in pressure of the input fluid supplied to said inlet, at each position said valve element enabling fluid in said fluid chamber to egress from said housing via a different outlet;
a plurality of distribution conduits, each of said distribution conduits being connected to a respective one of said outlets, each distribution conduit extending from said distribution valve into an outside environmentally exposed distribution field and discharging fluid onto said distribution field when the outlet to which the distribution conduit is connected, is connected to said fluid chamber by said valve element; and
a distribution valve monitor including a tubular housing defining an internal opening, said distribution valve monitor housing accommodating a plurality of non-contact sensors arranged in a ring about said internal opening and a controller communicating with the sensors, said distribution valve monitor housing sliding coaxially over said distribution valve housing to accommodate said distribution valve housing in said opening and position said ring of sensors generally about the periphery of said valve element.

39. An irrigation/wastewater distribution system according to claim 38 wherein said controller compares data received from said sensors with desired distribution valve operation data to detect deviant distribution valve operation.

40. An irrigation/wastewater distribution system according to claim 39 wherein said sensors sense rotation of said valve element and reciprocation of said valve element.

41. An irrigation/wastewater distribution system according to claim 39 wherein said desired distribution valve operation data is programmable.

42. An irrigation/wastewater distribution system according to claim 39 further comprising a user interface including a display to enable received sensor data and/or distribution valve operation data to be visually presented.

43. An irrigation/wastewater distribution system according to claim 39 wherein said controller generates an alarm signal when said distribution valve jams or skips.

44. An irrigation/wastewater distribution system comprising:
- a distribution valve including a housing having an internal fluid chamber, an inlet communicating with said fluid chamber for coupling to an input fluid source to permit the ingress of fluid into said fluid chamber, a plurality of outlets communicating with said fluid chamber to permit the egress of fluid from said fluid chamber, and a valve element within said fluid chamber, said valve element unseating, rotating and re-seating through a sequence of positions in response to alternating drops and rises in pressure of the input fluid supplied to said inlet, at each position said valve element enabling fluid in said fluid chamber to egress from said housing via a different outlet;
- a plurality of distribution conduits, each of said distribution conduits being connected to a respective one of said outlets, each distribution conduit extending from said distribution valve into an outside environmentally exposed distribution field and discharging fluid onto said distribution field when the outlet to which the distribution conduit is connected, is connected to said fluid chamber by said valve element; and
- a self-contained distribution valve monitor monitoring operation of said distribution valve, said distribution valve monitor including a tubular housing defining a generally cylindrical internal bore and a plurality of spaced sensors within said tubular housing and arranged in a ring surrounding said bore, said distribution valve monitor housing being slidably fitted onto said distribution valve housing so that said distribution valve housing is accommodated by said bore with said ring of sensors being positioned about the periphery of said valve element.

45. A distribution valve monitor to monitor the operation of a distribution valve, said distribution valve comprising at least one inlet delivering fluid to a fluid chamber, a plurality of outlets and a valve member disposed within said fluid chamber and moveable to connect each of said outlets to said fluid chamber in succession in response to alternating drops and rises in pressure of the fluid supplied to said inlet, wherein said valve member includes a rotatable disc having a passage therein alignable with each outlet in succession and a reciprocating plunger on said disc, said disc carrying at least one rotary position indicator and said plunger carrying at least one axial position indicator, said distribution valve monitor comprising:
- a plurality of non-contact sensors disposed at spaced locations external of said fluid chamber to sense the presence of the at least one rotary position indicator as said disc rotates and to sense the presence of the at least one axial position indicator as said plunger reciprocates; and
- a controller communicating with the sensors and recording data representing the operation of the distribution valve, said recorded data being examined to detect improper operation of said distribution valve.

46. A distribution valve monitor according to claim 45 wherein said controller generates an alarm signal when the operation of said distribution valve is determined to have been compromised.

47. A distribution valve monitor according to claim 46 wherein said controller generates said alarm signal when said distribution valve jams or skips.

48. A distribution valve monitor according to claim 45 wherein said sensors are hall effect sensors that detect the presence of magnets disposed on said disc and plunger.

49. A distribution valve monitor according to claim 45 wherein at least one of said sensors and controller are accommodated within an enclosure.

50. A distribution valve monitor according to claim 49 wherein said enclosure is shaped to receive said distribution valve.

51. A distribution valve monitor according to claim 50 wherein said sensors are hall effect sensors that detect the presence of magnets disposed on said disc and plunger.

52. A distribution valve monitor according to claim 47 further comprising:
- a user interface including a display to enable recorded data and/or distribution valve operation data to be visually presented.

53. A distribution valve monitor according to claim 52 wherein said controller compares recorded data with desired distribution valve operating data to detect improper distribution valve operation.

54. A distribution valve monitor according to claim 53 wherein said desired distribution valve operating data is programmable.

55. A distribution valve monitor according to claim 45 further comprising:
- an interface to enable recorded distribution valve operation data to be downloaded to a remote location.

56. A distribution valve according to claim 55 further comprising:
- a user interface including a display to enable recorded data and/or distribution valve operation data to be visually presented.

57. A distribution valve according to claim 56 wherein said controller compares recorded data with desired distribution valve operating data to detect improper distribution valve operation.

58. A distribution valve according to claim 57 wherein said desired distribution valve operating data is programmable.

* * * * *